(12) United States Patent
Zhang et al.

(10) Patent No.: US 10,089,136 B1
(45) Date of Patent: Oct. 2, 2018

(54) MONITORING PERFORMANCE OF TRANSIENT VIRTUAL VOLUMES CREATED FOR A VIRTUAL MACHINE

(71) Applicant: EMC IP Holding Company LLC, Hopkinton, MA (US)

(72) Inventors: Minjie Zhang, Shanghai (CN); Arun Joseph, Morrisville, NC (US); Yue Zhao, Shanghai (CN); Peiyu Zhuang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 189 days.

(21) Appl. No.: 15/278,646

(22) Filed: Sep. 28, 2016

(51) Int. Cl.
*G06F 9/455* (2018.01)
*G06F 11/30* (2006.01)
*G06F 11/34* (2006.01)

(52) U.S. Cl.
CPC ........ *G06F 9/45558* (2013.01); *G06F 11/301* (2013.01); *G06F 11/3075* (2013.01); *G06F 11/3495* (2013.01); *G06F 11/3034* (2013.01); *G06F 2009/45579* (2013.01); *G06F 2009/45591* (2013.01)

(58) Field of Classification Search
CPC ......... G06F 11/30–11/36; G06F 9/45533–9/46
USPC .......................................................... 718/1
See application file for complete search history.

(56) References Cited

U.S. PATENT DOCUMENTS

| 7,484,066 | B2 | 1/2009 | Shitomi et al. |
| 8,041,917 | B2 | 10/2011 | Matsubara et al. |
| 8,225,041 | B2 | 7/2012 | Fujita et al. |
| 8,930,621 | B2 | 1/2015 | Hiwatashi et al. |
| 9,432,256 | B2 | 8/2016 | Terayama et al. |
| 2007/0283091 | A1* | 12/2007 | Nagae ..................... G06F 3/061 711/114 |
| 2008/0104350 | A1* | 5/2008 | Shimizu ................ G06F 3/0605 711/165 |

(Continued)

OTHER PUBLICATIONS

Implementing VMware Virtual Volumes on HP 3PAR StoreServ Hewlett-Packard Development Company 4AA5-6907ENW, Rev. 2 Published: Jul. 2015.*

(Continued)

*Primary Examiner* — Emerson Puente
*Assistant Examiner* — Paul Mills
(74) *Attorney, Agent, or Firm* — BainwoodHuang (57) ABSTRACT

Techniques are disclosed for monitoring the performance of transient virtual volumes created for a virtual machine. Each transient virtual volume is created in response to a first trigger event, used by the virtualization environment solely to perform a single function supporting execution of the virtual machine, and deleted in response to a second trigger event. When creation of a current transient virtual volume is detected, and while the virtualization environment uses the current transient virtual volume to perform a single function supporting execution of the virtual machine, performance data is collected for the current transient virtual volume, and combined with performance data collected for at least one other, previously deleted transient virtual volume that was used solely to perform the same single function supporting execution of the same virtual machine. The combined performance data is represented as performance data for a single monitored virtual volume associated with the virtual machine.

17 Claims, 8 Drawing Sheets

(56) References Cited

U.S. PATENT DOCUMENTS

| | | | | |
|---|---|---|---|---|
| 2008/0307271 | A1* | 12/2008 | Nakajima | G06F 3/0605 714/47.2 |
| 2009/0113156 | A1* | 4/2009 | Fujita | G06F 11/3409 711/165 |
| 2009/0150639 | A1* | 6/2009 | Ohata | G06F 3/0608 711/172 |
| 2009/0235269 | A1* | 9/2009 | Nakajima | G06F 3/061 718/104 |
| 2010/0299489 | A1* | 11/2010 | Balachandriah | G06F 11/3442 711/162 |
| 2011/0145528 | A1* | 6/2011 | Watanabe | G06F 3/0605 711/162 |
| 2011/0167236 | A1* | 7/2011 | Orikasa | G06F 3/0608 711/165 |
| 2011/0231580 | A1* | 9/2011 | Nakamichi | G06F 3/0605 710/9 |
| 2012/0005435 | A1* | 1/2012 | Emaru | G06F 3/0608 711/154 |
| 2012/0110263 | A1* | 5/2012 | Fujita | G06F 11/3409 711/114 |
| 2012/0131196 | A1* | 5/2012 | Yamada | G06F 11/3485 709/226 |
| 2013/0047153 | A1* | 2/2013 | Emaru | G06F 3/0607 718/1 |
| 2013/0132696 | A1* | 5/2013 | Tomida | G06F 13/10 711/165 |
| 2013/0145092 | A1* | 6/2013 | Miwa | G06F 3/061 711/114 |
| 2014/0115709 | A1* | 4/2014 | Gross | G06F 21/62 726/26 |
| 2014/0173227 | A1* | 6/2014 | Min | G06F 3/0644 711/159 |
| 2014/0344807 | A1* | 11/2014 | Bursell | G06F 9/45558 718/1 |
| 2015/0106565 | A1* | 4/2015 | Ayukawa | G06F 3/061 711/114 |
| 2015/0248253 | A1* | 9/2015 | Kim | G06F 3/0611 707/723 |
| 2016/0085481 | A1* | 3/2016 | Antony | G06F 3/0659 718/1 |
| 2017/0220300 | A1* | 8/2017 | Thomas | G06F 3/0665 |

OTHER PUBLICATIONS

VMware vSphere Virtual Volumes on Dell PS Series Dell Engineering Published: Mar. 2015.*

Resource Management and Monitoring VMware vSphere: Install, Configure, Manage—Revision A Published: 2012.*

ESX Memory Resource Management: Swap Ishan Banerjee Philip Moltmann Kiran Tati Rajesh Venkatasubramanian Published: 2014.*

* cited by examiner

MONITORING PERFORMANCE OF TRANSIENT VIRTUAL VOLUMES CREATED FOR A VIRTUAL MACHINE

BACKGROUND

As it is generally known, virtual machines are computer software emulations of hardware computer systems. Virtual machines are typically created by and run on a hypervisor or virtual machine monitor that may also be referred to as a virtualization platform, and that is referred to herein as a virtualization environment. The computer on which a virtualization environment executes may be referred to as a host computer. The virtualization environment manages execution of each virtual machine, and distributes virtualized hardware resources of the host computer (e.g. processor resources, memory resources, I/O interface resources, etc.) to each virtual machine.

Like the hardware computer systems that they emulate, virtual machines require data storage resources to support the programs that they execute. It is accordingly necessary to provision data storage resources to a virtual machine from a physical storage system, for example by assigning disk space of a remote storage server system to the virtual machine.

Performance data for storage resources that are used to support the execution of a virtual machine must be accurately monitored for numerous reasons. For example, the performance data for storage resources created for a virtual machine may be needed to determine whether specific performance levels for the virtual machine are being met, and/or to determine whether storage resource utilization limits for the virtual machine are being exceeded.

SUMMARY

Previous approaches to monitoring the performance of storage resources used to support the execution of a virtual machine have exhibited significant shortcomings. In previous systems, virtual volumes have been used to represent individual disks of virtual machines, and have been provisioned from physical storage resources in physical storage systems. Previous performance monitoring tools have operated by monitoring the performance of each individual virtual volume that is created for a virtual machine. This approach is adequate for some types of virtual volumes, since many virtual volumes created for a virtual machine are maintained over the entire lifetime of the virtual machine. However, certain types of virtual volumes are automatically created for a virtual machine at the time they are needed, and then automatically deleted when they are no longer needed, prior to the virtual machine being deleted. For example, some virtual volumes are used solely for specific functions that are performed in response to specific events, and are then deleted after the function they are used to support is completed. In such cases, previous performance monitoring systems have not effectively maintained performance data for the deleted virtual volumes, and have instead reported that the previously created virtual volumes are no longer operating. Historical performance data of the virtual volumes was not maintained once the virtual volumes were destroyed. As a result, if a large number of virtual volumes were created and destroyed during the lifetime of a virtual machine, e.g. to repeatedly perform a single specific function supporting execution of the virtual machine, previous monitoring tools presented similarly large numbers of indications that a virtual volume was created but is no longer available, potentially resulting in a user misperception that there is a problem with the operational status of the underlying storage resources. Moreover, the lack of access to potentially important historical performance data related to the previously destroyed virtual volumes has been a significant limitation.

To address the above described and other shortcomings of previous solutions, new techniques are disclosed herein for monitoring the performance of transient virtual volumes that are created for a virtual machine executing in a virtualization environment. The disclosed techniques include monitoring the creation of virtual volumes for the virtual machine in order to detect when a virtual volume that is created for the virtual machine is a transient virtual volume. For example, a type of each virtual volume created for the virtual machine may be checked to determine whether it matches a transient virtual volume type.

In the disclosed techniques, each transient virtual volume is automatically created for the virtual machine in response to a first trigger event, and each transient virtual volume is used by the virtualization environment solely to perform a single function supporting execution of the virtual machine. A second corresponding trigger event causes each transient virtual volume to be automatically deleted.

The disclosed techniques further include i) detecting that a virtual volume created for the virtual machine is a current transient virtual volume (e.g. based on the type of the created virtual volume) and accordingly is being used by the virtualization environment to perform the single function supporting execution of the virtual machine associated with the type of the virtual volume, and ii) while the virtualization environment uses the current transient virtual volume to perform that single function supporting execution of the virtual machine, collecting performance data for the current transient virtual volume. The performance data collected for the current transient virtual volume is then combined with performance data that was previously collected for at least one other, previously deleted transient virtual volume that was previously used by the virtualization environment to perform the same single function supporting execution of the same virtual machine (e.g. a previously deleted virtual volume of the same type as the current transient virtual volume and created for the same virtual machine), and the combined performance data is subsequently represented as performance data for a single monitored virtual volume associated with the virtual machine.

In one example, the current transient virtual volume may consist of a swap virtual volume, and the first trigger event may consist of the virtual machine being started (e.g. initially started or subsequently restarted). In the case where the current transient virtual volume is a swap virtual volume, the single function performed by the virtualization environment using the current transient virtual volume consists of storing, by the virtualization environment while the virtual machine executes, copies of virtual machine memory pages on the current transient virtual volume that cannot be retained in the memory of the host computer on which the virtualization environment executes. Further in the case where the current transient virtual volume is a swap virtual volume, the second trigger event that causes the current transient virtual volume to be automatically deleted consists of the virtual machine being shut down, since the swap virtual volume is only needed while the virtual machine is running, and is no longer needed after the virtual machine is shut down. A new current swap virtual volume is automatically created for the virtual machine when the virtual machine is later restarted.

In another example, the current transient virtual volume may consist of a memory virtual volume, and the first trigger event may consist of execution of the virtual machine being suspended, or a request for creation of a snapshot of the virtual machine including the memory of the virtual machine. In the case where the current transient virtual volume is a memory virtual volume, the single function performed by the virtualization environment using the current transient virtual volume consists of storing a complete copy of the virtual machine's memory into the current transient virtual volume at the time the virtual machine is suspended, or when the snapshot is created. Further in the case where the current transient virtual volume is a memory virtual volume, the second trigger event that causes the current transient virtual volume to be automatically deleted consists of storing the contents of the current transient virtual volume into the virtual machine's memory and resuming execution of the virtual machine, since the memory virtual volume is only needed until its contents are restored to the virtual machine's memory, and not after execution of the virtual machine is resumed with the virtual machine's memory restored from the contents of the memory virtual volume.

Examples of the performance data that may be collected for a current transient virtual volume, and that are combined with performance data previously collected for at least one other, previously deleted transient virtual volume that was previously used by the virtualization environment to perform the same single function supporting execution of the same virtual machine, include performance metrics regarding I/O operations performed on the transient virtual volume such as i) read I/O operations per second, ii) read I/O operation megabytes per second, iii) write I/O operations per second, iv) write I/O operation megabytes per second, v) total I/O operations per second, vi) total I/O operation megabytes per second, and/or vii) total I/O latency, and/or configuration metrics such as i) total capacity in megabytes, ii) consumed capacity in megabytes, and/or iii) available capacity in megabytes.

In another aspect of the disclosed techniques, the combined performance data may be represented as performance data for a single monitored virtual volume associated with the virtual machine by displaying the combined performance data in a single user interface object that simultaneously displays both the performance data collected for the current transient virtual volume and the performance data that was previously collected for at least one other previously deleted transient virtual volume that was previously used by the virtualization environment to perform the same single function supporting execution of the same virtual machine.

The disclosed system may be embodied to provide significant advantages over previous technologies. For example, the disclosed techniques enable historical performance data of virtual volumes to be effectively maintained even after the virtual volumes are deleted. By combining performance data collected for a current transient virtual volume with performance data that was previously collected for one or more previously deleted transient virtual volumes that were previously used by the virtualization environment to perform the same single function supporting execution of the same virtual machine, the disclosed techniques avoid presenting large numbers of indications that virtual volumes have been created but are longer available. Moreover, the disclosed techniques provide access to potentially important historical performance data of previously destroyed virtual volumes in a way that ties together the performance data of multiple, functionally-related transient virtual volumes over time.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the invention hereof is broader than the specific example embodiments disclosed.

The techniques for monitoring performance of transient virtual volumes of a virtual machine executing in a virtualization environment described herein include monitoring the virtual volumes created for the virtual machine in order to detect when a virtual volume created for the virtual machine is a transient virtual volume. As disclosed herein, each transient virtual volume is a virtual volume that is a) automatically created for the virtual machine in response to a first trigger event, b) used by the virtualization environment solely to perform a single function supporting execution of the virtual machine, and c) automatically deleted in response to a second trigger event. The disclosed techniques further include detecting that a virtual volume created for the virtual machine is a current transient virtual volume and is being used by the virtualization environment to perform the single function supporting execution of the virtual machine, e.g. based on a type of the virtual volume created for the virtual machine being a transient virtual volume type. As further described below, examples of transient virtual volume types include swap virtual volumes and memory virtual volumes.

While the virtualization environment uses the current transient virtual volume to perform a single function supporting execution of the virtual machine, performance data is collected for the transient virtual volume. The performance data collected for the transient virtual volume is combined with performance data that was previously collected for at least one other, previously deleted transient virtual volume, that was previously used by the virtualization environment to perform the same single function supporting execution of the same virtual machine (e.g. at least one previously deleted virtual volume of the same transient virtual volume type that was created for the same virtual machine). The combined performance data is represented as performance data for a single monitored virtual volume associated with the virtual machine.

Figure 1:
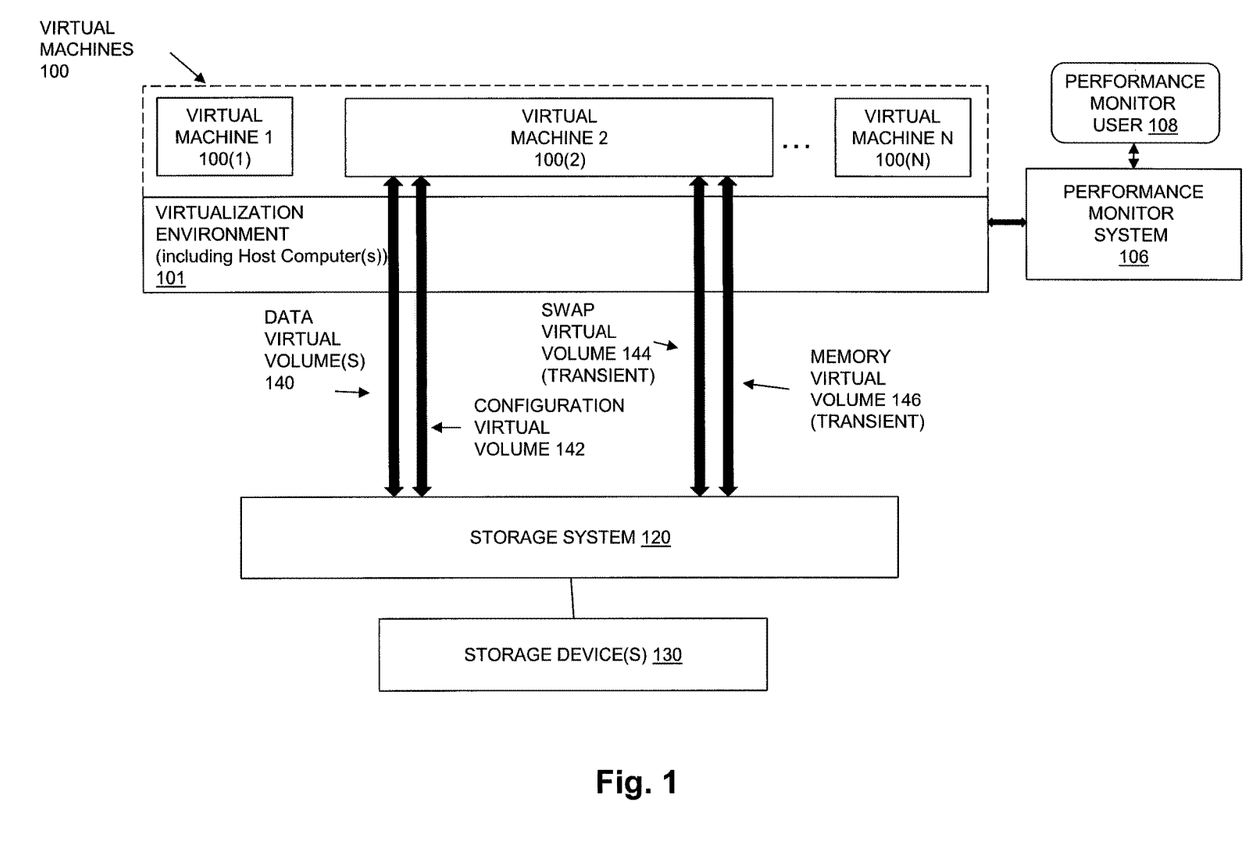
FIG. 1 is a block diagram showing an example of components in an operational environment including an embodiment of the disclosed system.

FIG. 1 is a block diagram showing an example of components in an operational environment including an embodiment of the disclosed system. As shown in FIG. 1, Virtual Machines 100, shown including Virtual Machine 1 100(1) through Virtual Machine N 100(N), execute on Virtualization Environment 101. Each of Virtual Machines 100 may be a computer software emulation of a hardware computer system, and may execute one or more programs as if they were executing on actual hardware. Each one of Virtual Machines 100 may, for example, include or consist of a complete simulation of a computer's underlying hardware, on which may execute various programs, such as a complete operating system, one or more application programs, and/or other specific types of programs. The Virtualization Environment 101 on which Virtual Machines 100 execute may, for example, include or consist of a hypervisor or virtual machine monitor, executing on one or more host computers. Virtualization Environment 101 manages execution of each one of Virtual Machines 100, and allocates hardware resources from the host computer(s) on which it executes to each one of the Virtual Machines 100. Hardware resources allocated by Virtualization Environment 101 from the host computer(s) to individual virtual machines in Virtual Machines 100 may include, for example, host computer processors, host computer memory, and/or host computer I/O interfaces.

During operation of the components shown in FIG. 1, Storage System 120 provides storage to support execution of Virtual Machines 100, e.g. over one or more data communication networks to which Storage System 120 and Virtualization Environment 101 are both communicably connected. The storage provided to support execution of Virtual Machines 100 is based on units of storage allocated from Storage Device(s) 130. Storage System 120 may include, be attached to or associated with one or more physical storage devices from which it may allocate units of physical storage.

In the example of FIG. 1, Storage System 120 allocates units of storage from Storage Device(s) 130. While Storage Device(s) 130 is shown directly connected to Storage System 120, the disclosed system is not so limited. In an alternative embodiment, some or all of Storage Device(s) 130 may be communicably connected to Storage System 120 by way of one or more communication networks, e.g. including or consisting of a Storage Area Network (SAN) or the like.

Storage System 120 may each include at least one processor and program storage, such as memory and/or another computer readable medium, for storing program code executable on the processor, and for storing data operated on by such program code. Storage System 120 may further include one or more input/output devices and/or interfaces, such as data communication and/or peripheral devices and/or interfaces. The program code executing on each of the Storage System 120 may include software or firmware that provides one or more storage services to Virtual Machines 100.

Storage Device(s) 130 may be embodied using any specific kind of data storage mechanism, including but not limited to one or more non-volatile storage devices, such as magnetic disk drives, electronic flash drives, and/or optical drives.

Further during operation of the components shown in FIG. 1, as part of providing storage services to Virtual Machines 100, Storage System 120 provides storage objects that are referred to as "virtual volumes" or "VVOLS" to the Virtual Machines 100. Different types of virtual volumes may be provided, and Storage System 120 may provide a number of different types of virtual volumes to support execution of each virtual machine, as further described below.

For each virtual machine, Storage System 120 may provide one or more data virtual volumes, each of which serves as a virtual disk for the virtual machine, e.g. to store data for one or more applications executing on the virtual machine. For example, in FIG. 1 Storage System 120 provides Virtual Machine 2 100(2) with Data Virtual Volume(s) 140. In addition, Storage System 120 may provide each virtual machine with a configuration virtual volume that is used to store configuration and state information about the virtual machine. For example, in FIG. 1 Storage System 120 provides Virtual Machine 2 100(2) with Configuration Virtual Volume 142.

Storage System 120 may also provide a number of "transient" virtual volumes created for each one of the virtual machines in Virtual Machines 100. Each one of the transient virtual volumes created by Storage System 120 for a virtual machine in Virtual Machines 100 is a virtual volume that is a) automatically created for the virtual machine in response to a first trigger event, b) used by the virtualization environment solely to perform a single function supporting execution of the virtual machine, and c) automatically deleted in response to a second trigger event. One type of transient virtual volume is a "swap" type of virtual volume. A new swap virtual volume is automatically created for a virtual machine each time the virtual machine is initially started, or when the virtual machine is later restarted after being shut down, for example in response to a user command requesting that the virtual machine be started or restarted, and is used by the virtualization environment solely for storing, while the virtual machine executes, copies of virtual machine memory pages that cannot be stored in a portion of the memory of the host computer that is reserved for use by the virtual machine, in order to allow the operational size of the virtual machine memory to exceed the size of the portion of the memory of the host computer that is reserved for use by the virtual machine. For example, in FIG. 1 Storage System 120 provides Virtual Machine 2 100(2) with Swap Virtual Volume 144. A swap virtual volume is automatically deleted in response to the virtual machine it is created for being shut down (e.g. in response to a user command requesting that the virtual machine be shut down).

Another type of transient virtual volume is a "memory" type of virtual volume. A memory virtual volume is automatically created for a virtual machine when the execution of the virtual machine is suspended (e.g. in response to a user command requesting that execution of the virtual machine paused or suspended), and is then used by the virtualization environment solely for storing a complete copy of the memory of the virtual machine as it existed at the time the execution of the virtual machine was suspended. For example, in FIG. 1 Storage System 120 provides Virtual Machine 2 100(2) with Memory Virtual Volume 146. A memory virtual volume created for a virtual machine is automatically deleted in response to the contents of the memory virtual volume being copied back into the memory of the virtual machine when the execution of the virtual machine is subsequently resumed (e.g. in response to a user command requesting that the execution of the virtual machine be resumed).

In another example, a memory virtual volume may be automatically created for a virtual machine in response to a request for creation of a snapshot of the virtual machine that includes a snapshot of the memory of the virtual machine. The memory virtual volume may then be used by the virtualization environment solely for storing a complete copy of the memory of the virtual machine as part of the virtual machine snapshot. In such a case, the memory virtual volume created for the virtual machine may be deleted after the virtual machine is reverted to the snapshot, or alternatively the memory virtual volume may be automatically deleted in response to subsequent deletion of the virtual machine snapshot.

Also shown in FIG. 1 is a Performance Monitor System 106 that is associated with and used by a Performance Monitor User 108. The Performance Monitor User 108 may, for example, be responsible for managing Virtualization Environment 101 and the virtual volumes created for Virtual Machines 100 using the Performance Monitor System 106. The Performance Monitor System 106 may consist of or include at least one processor, program storage, such as memory and/or another computer readable medium, for storing program code executable on the processor, and for storing data operated on by such program code. Performance Monitor System 106 may further include one or more input/output devices and/or interfaces, such as data communication and/or peripheral devices and/or interfaces, including a communication interface communicably coupled to one or more communication networks to which Virtualization Environment 101 and Storage System 120 are all communicably connected, as well as a computer keyboard and computer mouse, and a display device operable to provide a user interface such as a graphical user interface and/or command line interface. The program code executing on Performance Monitor System 106 may further include appropriate operating system and/or application software or tools. For example, Performance Monitor 106 may include program code that, when executed, monitors the performance of transient virtual volumes (e.g. Swap Virtual Volume 144 and/or Memory Virtual Volume 146) created for a virtual machine (e.g. Virtual Machine 2 100(2)) executing in a virtualization environment (e.g. Virtualization Environment 101) by monitoring the virtual volumes created for the virtual machine. The program code executing in Performance Monitor 106 may further operate to i) detect that a virtual volume created for the virtual machine is a current transient virtual volume, and ii) while the virtualization environment uses the current transient virtual volume to perform a single function supporting execution of the virtual machine, collect performance data for the current transient virtual volume. The program code executing in Performance Monitor 106 may further operate to i) combine the performance data collected for the current transient virtual volume with performance data that was previously collected for at least one other, previously deleted transient virtual volume, that was previously used by the virtualization environment to perform the same single function supporting execution of the same virtual machine, and ii) represent the combined performance data as performance data for a single monitored virtual volume associated with the virtual machine, e.g. in a user interface displayed in a display device of Performance Monitor System 106.

Figure 2:
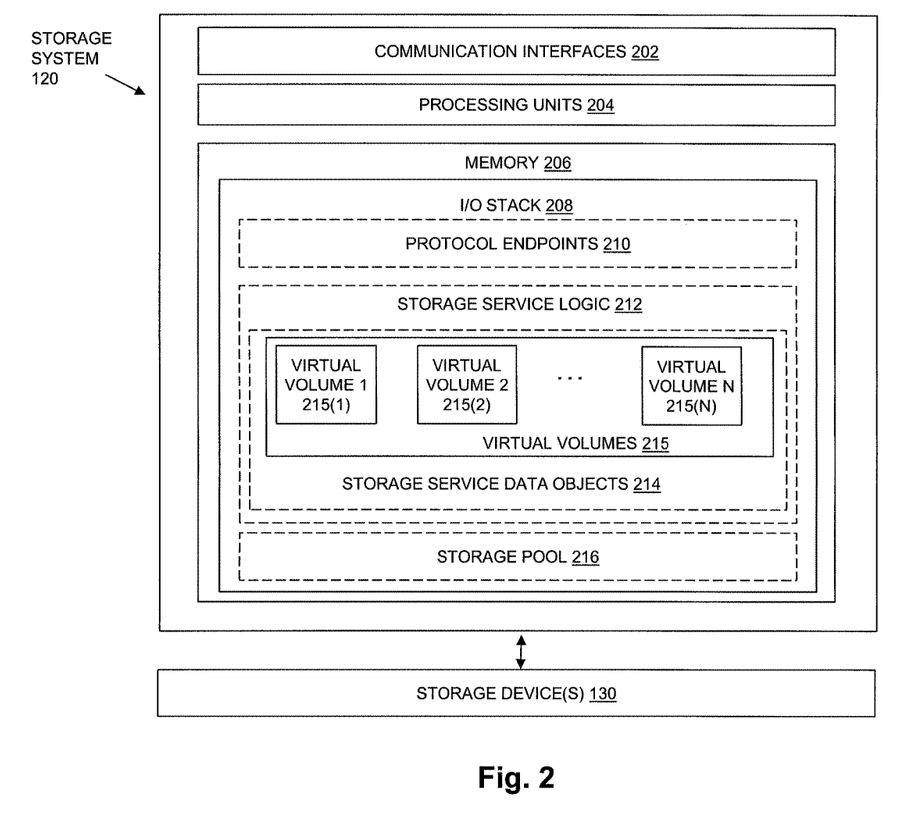
FIG. 2 is a block diagram showing an example of components in a storage system providing virtual volumes created for a virtual machine in an illustrative embodiment of the disclosed system.

FIG. 2 is a block diagram showing components in an illustrative embodiment of the Storage System 120 shown in FIG. 1. In the embodiment of FIG. 2, Storage System 120 receives I/O requests from Virtual Machines 100 and/or Virtualization Environment 101, and responds to such I/O requests by reading data from or writing data to the Storage Device(s) 130. In the embodiment of FIG. 2, the Storage System 120 includes one or more Communication Interfaces 202, a set of Processing Units 204, and Memory 206. The Communication Interfaces 202 include, for example, SCSI target adapters and/or network interface adapters for converting electronic and/or optical signals received over a network into electronic form for use by the Storage System 120. The set of Processing Units 204 includes one or more processing chips and/or assemblies. The Memory 206 includes both volatile memory (e.g., RAM), and non-volatile memory, such as one or more ROMs, disk drives, solid state drives, and the like. The set of Processing Units 204 and the Memory 206 together form control circuitry, which is constructed and arranged to carry out various methods and functions as described herein, e.g., alone or in coordination with similar control circuitry on one or more other data storage systems. The Memory 206 includes a variety of software constructs realized in the form of executable instructions. When the executable instructions are run by the set of Processing Units 204, the set of Processing Units 204 are caused to carry out the operations of the software constructs. Although certain software constructs are specifically shown and described, it is understood that the Memory 206 may include various other software constructs, which are not shown, such as an operating system, various applications, processes, and/or daemons.

In the embodiment of FIG. 2, Memory 206 includes an I/O Stack 208. The I/O Stack 208 provides an execution path for I/O requests received from Virtual Machines 100 and/or Virtualization Environment 101. The I/O Stack 208 is shown including Protocol End Points 210, Storage Service Logic 212, and Storage Pool 216. Those skilled in the art will also recognize that the I/O Stack 208 shown in FIG. 2 is simplified for purposes of concise explanation and illustration of the disclosed system, and that various components and/or elements other than those shown in FIG. 2 may also be present in the I/O Stack 208. While received I/O requests enter the I/O Stack 208 from the top and propagate downwards, the components of the I/O Stack 208 are described herein from the bottom to the top for ease of understanding.

The Storage Pool 216 organizes elements of the Storage Device(s) 130 into units of storage used by the Storage System 120. For example, in one embodiment, the Storage Pool 216 organizes elements of the Storage Device(s) 130 into "slices". A "slice" is an example of a unit of storage space (e.g. 256 megabytes or 1 gigabytes in size), which is derived from the Storage Device(s) 130. The Storage Pool 216 allocates slices of the Storage Device(s) 130 to be used by the Storage Service Logic 212 to create Storage Service Data Objects 214 that are provisioned to support storage provided to Virtual Machines 100 and/or to Virtualization Environment 101 to support execution of Virtual Machines 100. The Storage Service Data Objects 214 include a number of Virtual Volumes 215, shown as Virtual Volume 1 215(1) through Virtual Volume N 215(N). The Virtual Volumes 215 created by Storage System 120 may, for example, include Data Virtual Volume(s) 140, Configuration Virtual Volume 142, Swap Virtual Volume 144, and Memory Virtual Volume 146 created for Virtual Machine 2 100(2), as shown in FIG. 1.

The Protocol End Points 210 expose the Storage Service Data Objects 214 to Virtual Machines 100 and/or Virtualization Environment 101 for access by Virtual Machines 100 and/or Virtualization Environment 101 in accordance with respective storage service protocols. Thus, the Protocol End Points 210 may expose block-based objects (e.g. block-based VVols) through Fiber Channel or iSCSI protocols, and/or may expose file-based objects (e.g. file-based VVols) using NFS, CIFS, or SMB protocols.

Figure 3:
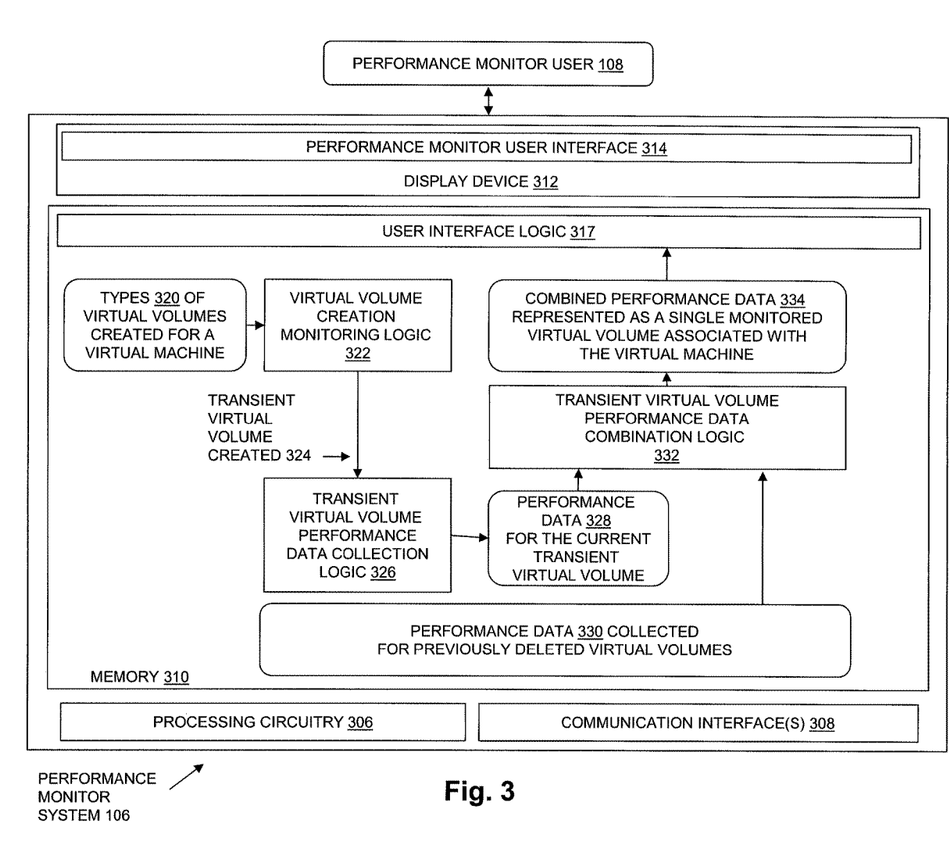
FIG. 3 is a block diagram showing an example of a performance monitor system.

FIG. 3 is a block diagram showing components in an illustrative embodiment of the Performance Monitor System 106 shown in FIG. 1. As shown in FIG. 3, components in the Performance Monitor System 106 may include a Memory 310, Processing Circuitry 306 and Communication Interfaces 308. Memory 310 may, for example, include or consist of any specific type of volatile or non-volatile semiconductor memory or the like that is operable to store programs (sequences of instructions) and/or data (e.g. program state information) for use in the Performance Monitor System 102. Processing Circuitry 306 may, for example, include or consist of one or more microprocessors or the like. Communication Interface(s) 308 may, for example, include or consist of one or more network interface cards (NICs) or the like. Performance Monitor System 106 is further shown including a Display Device 312.

In the illustrative embodiment of FIG. 3, Memory 310 stores program code for execution on the Processing Circuitry 306, including Virtual Volume Creation Monitoring Logic 322, Transient Virtual Volume Performance Data Collection Logic 326, and Transient Virtual Volume Performance Data Combination Logic 332. While in the embodiment of FIG. 3 the Virtual Volume Creation Monitoring Logic 322, Transient Virtual Volume Performance Data Collection Logic 326, and Transient Virtual Volume Performance Data Combination Logic 332 are located in the Performance Monitor System 106, the disclosed system is not so limited. Alternatively, one or more of Virtual Volume Creation Monitoring Logic 322, Transient Virtual Volume Performance Data Collection Logic 326, and/or Transient Virtual Volume Performance Data Combination Logic 332 may be located outside the Storage Administration System 102, such as, for example, within the Virtualization Environment 101, and/or within the Storage System 120.

During operation of the embodiment shown in FIG. 3, in order to monitor the performance of transient virtual volumes created for a virtual machine (e.g. Virtual Machine 2 100(2)) executing in a virtualization environment (e.g. Virtualization Environment 101), Virtual Volume Creation Monitoring Logic 322 monitors the virtual volumes created for the virtual machine. For example, Virtual Volume Creation Monitoring Logic 322 may detect when a virtual volume created for the virtual machine is a current transient virtual volume by monitoring Types 320 of virtual volumes created for the virtual machine. For example, each virtual volume created for the virtual machine may have a type of either DATA, CONFIGURATION, SWAP, or MEMORY. SWAP and MEMORY type virtual volumes are transient virtual volumes, and accordingly Virtual Volume Creation Monitoring Logic 322 may detect that a virtual volume created for the virtual machine is a current transient virtual volume when the type of the virtual volume is either SWAP or MEMORY.

Each transient virtual volume is automatically created for the virtual machine in response to a trigger event, and is used by the virtualization environment solely to perform a single function supporting execution of the virtual machine. For example, in response to a user causing the virtual machine to be started, a SWAP type virtual volume is created for the virtual machine, and the virtualization environment begins using the SWAP virtual volume for a single function, i.e. storing, while the virtual machine executes, copies of virtual machine memory pages that cannot be stored in the memory of the host computer allocated to the virtual machine. In another example, in response to a user causing the virtual machine to be suspended, or in response to a request to create a virtual machine snapshot, a MEMORY type virtual volume is created for the virtual machine, and the virtualization environment begins using the MEMORY virtual volume for a single function, i.e. storing a complete copy of the memory of the virtual machine at it existed at the time execution of the virtual machine was suspended, or at the time the request for the virtual machine snapshot was received.

When Virtual Volume Creation Monitoring Logic 322 detects that a virtual volume created for the virtual machine has a type of either SWAP or MEMORY, then Virtual Volume Creation Monitoring Logic 322 detects that a transient virtual volume has been created, and is accordingly being used for the specific function corresponding to the specific type of transient virtual volume. Virtual Volume Creation Monitoring Logic 322 then provides an indication 324 that a transient virtual volume has been created to Transient Virtual Volume Performance Data Collection Logic 326. The indication 324 causes Transient Virtual Volume Performance Data Collection Logic 326 to begin collecting Performance Data 328 for the current transient virtual volume, while it is being used for its corresponding function. Accordingly, Transient Virtual Volume Performance Data Collection Logic 326 collects performance data for a current SWAP virtual volume while it is being used to store copies of virtual machine memory pages that cannot be retained in the memory of the host computer allocated for use as the virtual machine's memory. Similarly, Transient Virtual Volume Performance Data Collection Logic 326 collects performance data for a current MEMORY virtual volume while it is being used to store a complete copy of the memory of the virtual machine from the time execution of the virtual machine was suspended, or from the time a request for the virtual machine snapshot was received.

Examples of Performance Data 328 that may be collected by Transient Virtual Volume Performance Data Collection Logic 326 for a current transient virtual volume include performance metrics regarding I/O operations performed on the transient virtual volume such as i) read I/O operations per second, ii) read I/O operation megabytes per second, iii) write I/O operations per second, iv) write I/O operation megabytes per second, v) total I/O operations per second, vi) total I/O operation megabytes per second, and/or vii) total I/O latency, and/or configuration metrics such as i) total capacity in megabytes, ii) consumed capacity in megabytes, and/or iii) available capacity in megabytes.

Transient Virtual Volume Performance Data Combination Logic 332 generates Combined Performance Data 334 by combining Performance Data 328 collected for the current transient virtual volume with Performance Data 330 that was previously collected for at least one other, previously deleted transient virtual volume that was previously used by the virtualization environment to perform the same single function supporting execution of the same virtual machine (e.g. at least one previously deleted transient virtual volume with the same type as the current transient virtual volume, and that was created for the same virtual machine). For example, in the case where Virtual Volume Creation Monitoring Logic 322 detected creation of a SWAP virtual volume for a virtual machine "VM-1", then Transient Virtual Volume Performance Data Collection Logic 326 would begin collecting Performance Data 328, such as read I/O operations per second performed on the newly created SWAP virtual volume (also referred to as the "current" SWAP virtual volume) while it is being used to store copies of virtual machine memory pages that cannot be retained in the memory of the host computer allocated to the virtual machine. Transient Virtual Volume Performance Data Combination Logic 332 would then combine the read I/O operations per second performance data it collected for the current SWAP virtual volume with read I/O operations per second performance data collected for another, previously created SWAP virtual volume that was also used to store copies of virtual machine memory pages that could not be retained in the memory of the host computer allocated to the virtual machine "VM-1", until a previous point in time when "VM-1" was shutdown, causing the previously created SWAP virtual volume to be deleted. In this way performance data may be combined that was collected for transient virtual volumes existing during different time periods, but that are used to perform the same function to support execution of the same virtual machine.

The Combined Performance Data 334 is represented as a single, monitored virtual volume associated with the virtual machine. For example, the combined read I/O operations per second may be represented as a single virtual volume for the virtual machine "VM-1", e.g. a single monitored virtual volume having a name that is a combination of the virtual machine name "VM-1" and a representation of the type of the current transient virtual volume, e.g. a single monitored virtual volume with a name of "VM-1.vswp", where "vswp" represents SWAP type transient virtual volumes. The Combined Performance Data 334 is passed to User Interface Logic 317, which displays Combined Performance Data 334 in Display Device 312 as at least a part of Performance Monitor User Interface 314.

Figure 4:
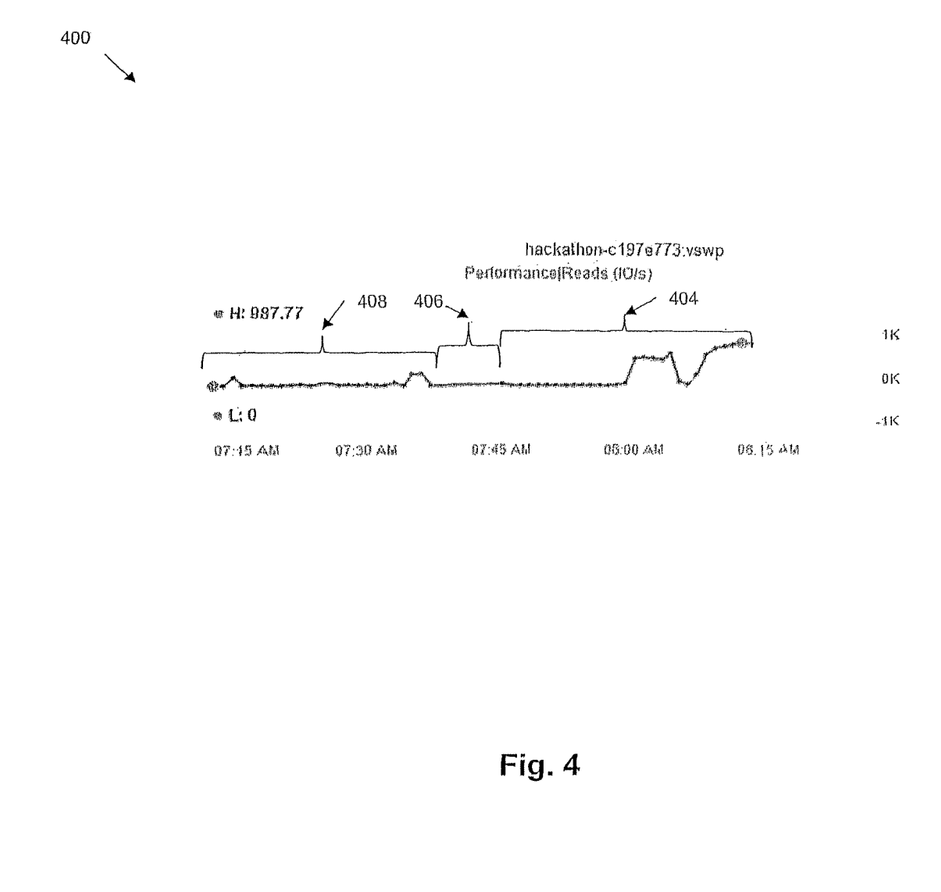
FIG. 4 shows an example of a performance monitor user interface display object displaying combined performance data for a read I/O per second performance metric of multiple, functionally-related transient virtual volumes for a single virtual machine, the combined performance data represented as performance data for a single monitored virtual volume associated with the virtual machine.

FIG. 4 shows an example of a portion 400 of Performance Monitor User Interface 314 that shows combined performance data for a read I/Os per second performance metric collected with regard to multiple, functionally-related transient virtual volumes created for a single virtual machine, represented as performance data for a single monitored virtual volume associated with the virtual machine. Specifically, FIG. 4 shows an example of how performance data for a read I/Os per second performance metric collected for multiple SWAP type transient virtual volumes created for a single virtual machine with a name "hackathon-c197e773" may be represented as performance data for a single monitored virtual volume associated with the virtual machine "hackathon-c197e773". In the example of FIG. 4, the combined performance data is represented as performance data for a single monitored virtual volume having a name of "hackathon-c197e773.vswp", where "hackathon-c197e773" is the name of the virtual machine, and "vswp" is an indication that the single monitored virtual volume is a SWAP type virtual volume created for the virtual machine "hackathon-c197e773". A first time period 408 contains collected performance data indicating the number of read I/O operations performed per second on a previously deleted SWAP virtual volume that was created for virtual machine "hackathon-c197e773". A second time period 406 contains no performance data, and represents a time period after the previously deleted SWAP virtual volume was deleted, and during which "hackathon-c197e773" was shut down. The time period 404 contains collected performance data indicating the number of read I/O operations performed per second on a current SWAP virtual volume created for "hackathon-c197e773".

Figure 5:
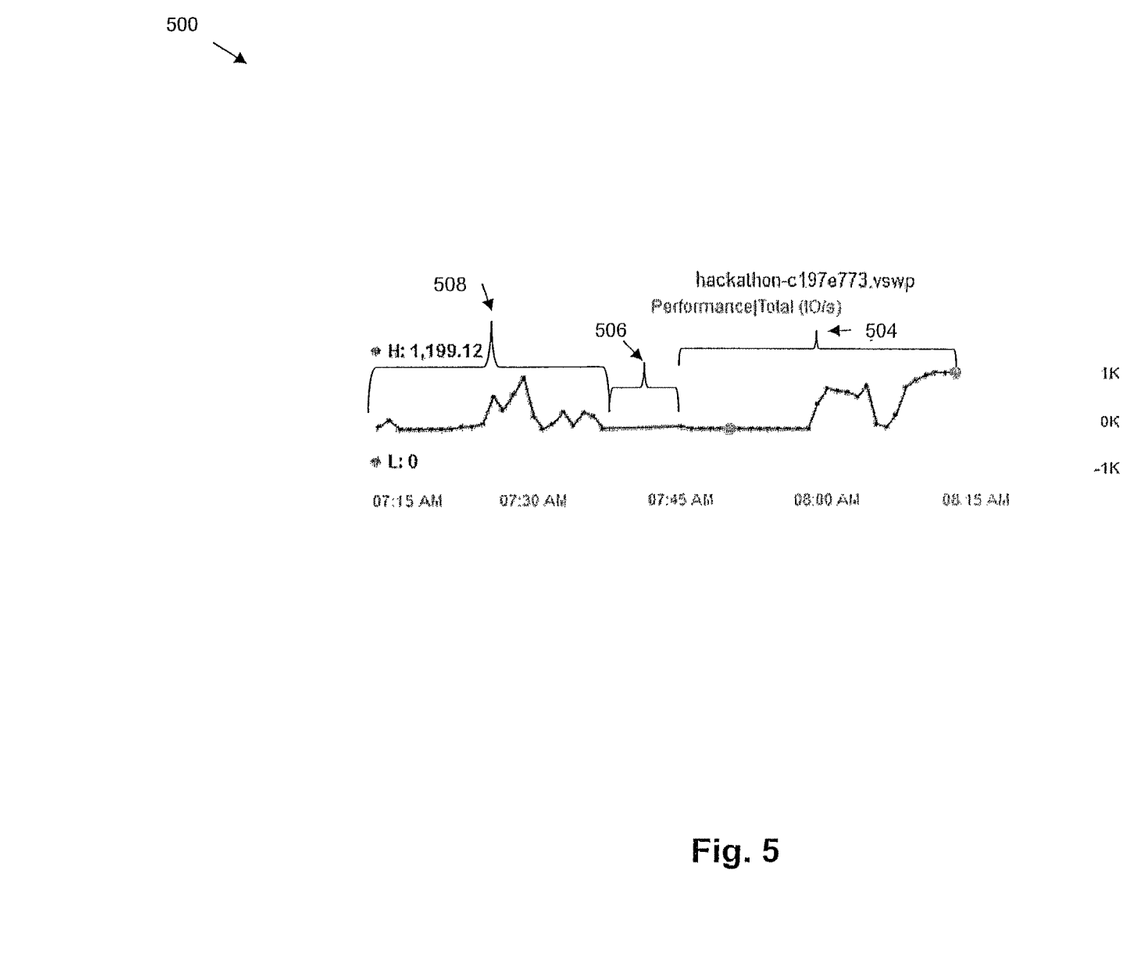
FIG. 5 shows an example of a performance monitor user interface display object displaying combined performance data for a total I/O per second performance metric of multiple, functionally-related transient virtual volumes for a single virtual machine, the combined performance data represented as performance data for a single monitored virtual volume associated with the virtual machine.

FIG. 5 shows an example of a portion 500 of Performance Monitor User Interface 314 that shows combined performance data for a total I/Os per second performance metric collected with regard to multiple, functionally-related transient virtual volumes created for a single virtual machine, represented as performance data for a single monitored virtual volume associated with the virtual machine. Specifically, FIG. 5 shows an example of how performance data for a total I/Os per second performance metric collected for multiple SWAP type transient virtual volumes created for a single virtual machine with a name "hackathon-c197e773" may be represented as performance data for a single monitored virtual volume associated with the virtual machine "hackathon-c197e773". In the example of FIG. 5, the combined performance data is represented as performance data for a single monitored virtual volume having a name of "hackathon-c197e773.vswp", where "hackathon-c197e773" is the name of the virtual machine, and "vswp" is an indication that the single monitored virtual volume is a SWAP type virtual volume created for the virtual machine "hackathon-c197e773". A first time period 508 contains collected performance data indicating the total number of I/O operations (reads and writes) performed per second on a previously deleted SWAP virtual volume that was created for virtual machine "hackathon-c197e773". A second time period 506 contains no performance data, and represents a time period after the previously deleted SWAP virtual volume was deleted, and during which "hackathon-c197e773" was shut down. The time period 504 contains collected performance data indicating the total number of I/O operations performed per second on a current SWAP virtual volume created for "hackathon-c197e773".

Figure 6:
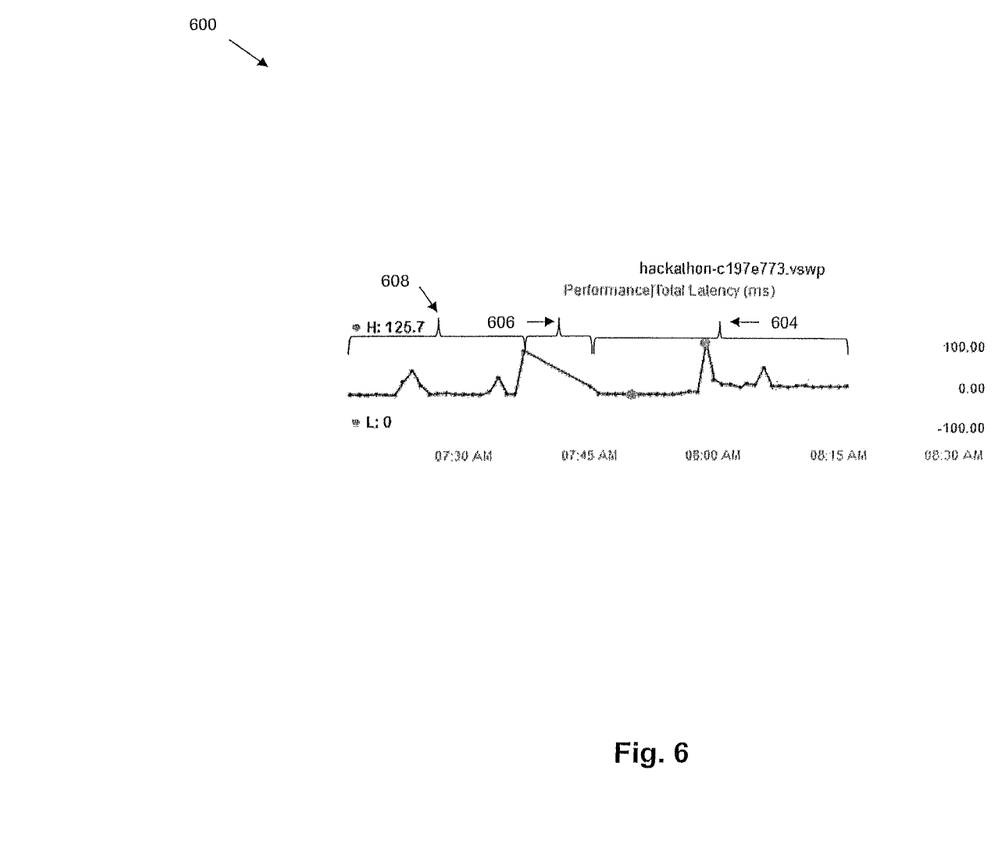
FIG. 6 shows an example of a performance monitor user interface display object displaying combined performance data for a total latency performance metric of multiple, functionally-related transient virtual volumes for a single virtual machine, the combined performance data represented as performance data for a single monitored virtual volume associated with the virtual machine.

FIG. 6 shows an example of a portion 600 of Performance Monitor User Interface 314 that shows combined performance data for a total latency performance metric collected with regard to multiple, functionally-related transient virtual volumes created for a single virtual machine, represented as performance data for a single monitored virtual volume associated with the virtual machine. Specifically, FIG. 6 shows an example of how performance data for a total latency performance metric collected for multiple SWAP type transient virtual volumes created for a single virtual machine with a name "hackathon-c197e773" may be represented as performance data for a single monitored virtual volume associated with the virtual machine "hackathon-c197e773". In the example of FIG. 6, the combined performance data is represented as performance data for a single monitored virtual volume having a name of "hackathon-c197e773.vswp", where "hackathon-c197e773" is the name of the virtual machine, and "vswp" is an indication that the single monitored virtual volume is a SWAP type virtual volume created for the virtual machine "hackathon-c197e773". A first time period 608 contains collected performance data indicating the total latency in milliseconds for I/O operations (reads and writes) performed on a previously deleted SWAP virtual volume that was created for virtual machine "hackathon-c197e773". A second time period 606 contains no performance data, and represents a time period after the previously deleted SWAP virtual volume was deleted, and during which "hackathon-c197e773" was shut down. The time period 604 contains collected performance data indicating the total latency in milliseconds for I/O operations performed on a current SWAP virtual volume created for "hackathon-c197e773".

Figure 7:
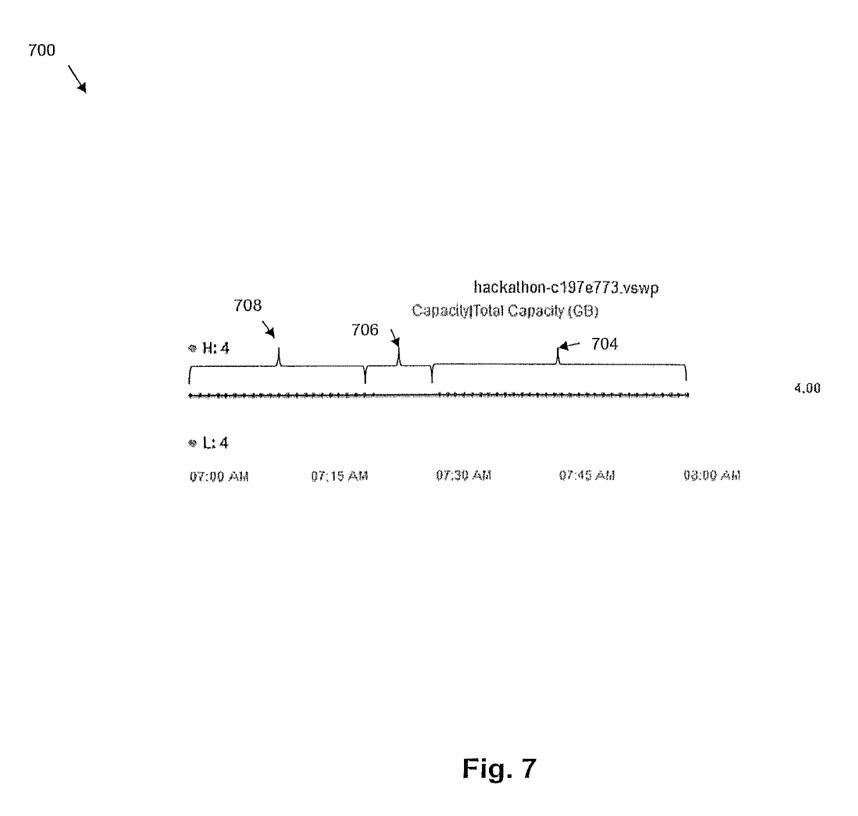
FIG. 7 shows an example of a performance monitor user interface display object displaying combined performance data for a total capacity configuration metric of multiple, functionally-related transient virtual volumes for a single virtual machine, the combined performance data represented as performance data for a single monitored virtual volume associated with the virtual machine.

FIG. 7 shows an example of a portion 500 of Performance Monitor User Interface 314 that shows combined performance data for a total capacity configuration metric collected with regard to multiple, functionally-related transient virtual volumes created for a single virtual machine, represented as performance data for a single monitored virtual volume associated with the virtual machine. Specifically, FIG. 7 shows an example of how performance data for a total capacity configuration metric collected for multiple SWAP type transient virtual volumes created for a single virtual machine with a name "hackathon-c197e773" may be represented as performance data for a single monitored virtual volume associated with the virtual machine "hackathon-c197e773". In the example of FIG. 7, the combined performance data is represented as performance data for a single monitored virtual volume having a name of "hackathon-c197e773.vswp", where "hackathon-c197e773" is the name of the virtual machine, and "vswp" is an indication that the single monitored virtual volume is a SWAP type virtual volume created for the virtual machine "hackathon-c197e773". A first time period 708 contains collected performance data indicating the total capacity of a previously deleted SWAP virtual volume that was created for virtual machine "hackathon-c197e773". A second time period 706 contains no performance data, and represents a time period after the previously deleted SWAP virtual volume was deleted, and during which "hackathon-c197e773" was shut down. The time period 704 contains collected performance data indicating the total capacity of a current SWAP virtual volume created for "hackathon-c197e773".

Figure 8:
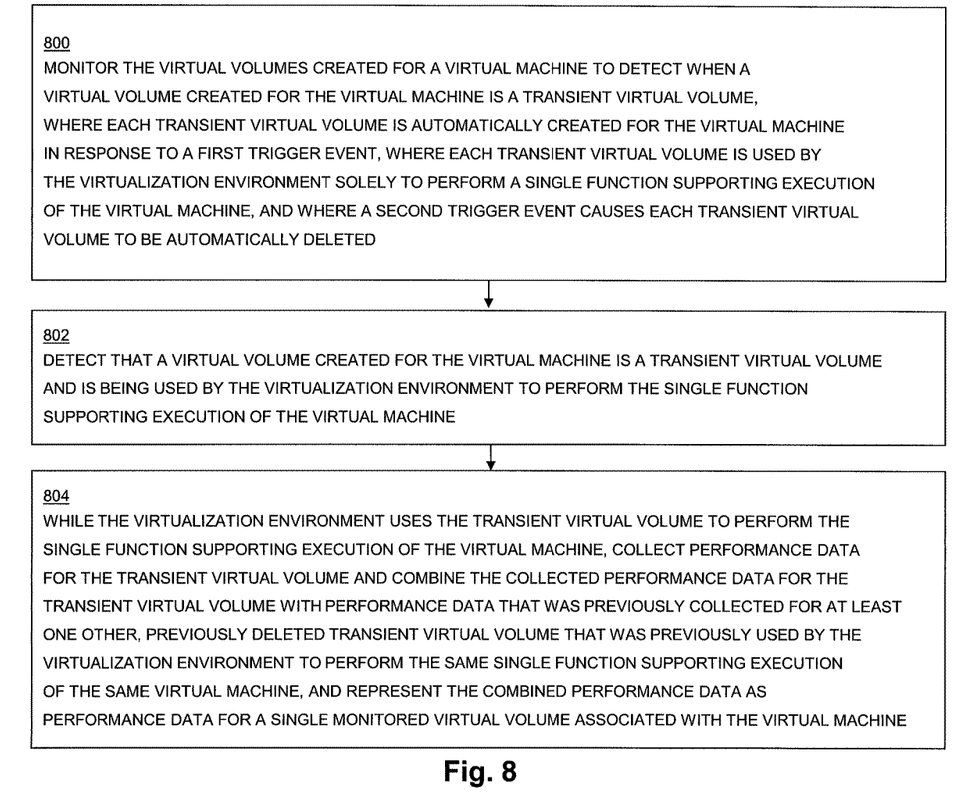
FIG. 8 is a flow chart showing an example of steps performed during operation of an embodiment of the disclosed techniques.

FIG. 8 is a flow chart showing an example of steps performed during operation of an embodiment of the disclosed techniques. At 800, the disclosed system monitors the virtual volumes created for a virtual machine to detect when a virtual volume created for the virtual machine is a transient virtual volume. Each transient virtual volume is i) automatically created for the virtual machine in response to a first trigger event, ii) used by the virtualization environment solely to perform a single function supporting execution of the virtual machine, and iii) automatically deleted in response to a second trigger event.

At 802, the disclosed system detects that a virtual volume created for the virtual machine is a transient virtual volume, and is accordingly being used by the virtualization environment to perform the single function supporting execution of the virtual machine corresponding to its transient virtual volume type.

At 804, while the virtualization environment uses the transient virtual volume to perform the single function supporting execution of the virtual machine, the disclosed system collects performance data for the current transient virtual volume and combines the collected performance data for the current transient virtual volume with performance data that was previously collected for at least one other, previously deleted transient virtual volume that was previously used by the virtualization environment to perform the same single function supporting execution of the same virtual machine. The combined performance data is represented as performance data for a single monitored virtual volume associated with the virtual machine.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of monitoring performance of transient virtual volumes of a virtual machine executing in a virtualization environment, comprising the steps of:
    monitoring the virtual volumes created for the virtual machine to detect when a virtual volume created for the virtual machine comprises a transient virtual volume, wherein each transient virtual volume is automatically created for the virtual machine in response to a first trigger event, wherein each transient virtual volume is used by the virtualization environment solely to perform a single function supporting execution of the virtual machine, and wherein a second trigger event causes each transient virtual volume to be automatically deleted;
    detecting that a virtual volume created for the virtual machine is a current transient virtual volume and is being used by the virtualization environment to perform the single function supporting execution of the virtual machine; and
    while the virtualization environment uses the current transient virtual volume to perform the single function supporting execution of the virtual machine, collecting performance data for the current transient virtual volume and combining the collected performance data for the current transient virtual volume with performance data that was previously collected for at least one other, previously deleted transient virtual volume that was previously used by the virtualization environment to perform the same single function supporting execution of the same virtual machine, wherein the combined performance data is represented as performance data for a single monitored virtual volume associated with the virtual machine.

2. The method of claim 1, wherein the current transient virtual volume comprises a swap virtual volume and the first trigger event comprises the virtual machine being started;
    wherein the single function performed by the virtualization environment using the current transient virtual volume comprises storing, while the virtual machine executes, copies of virtual machine memory pages on the current transient virtual volume that cannot be stored in memory of the virtual machine, wherein the memory of the virtual machine is allocated from memory of a host computer on which the virtualization environment executes; and
    wherein the second trigger event that causes the current transient virtual volume to be automatically deleted comprises the current virtual machine being shut down.

3. The method of claim 1, wherein the current transient virtual volume comprises a memory virtual volume and the first trigger event comprises execution of the virtual machine being suspended;
    wherein the single function performed by the virtualization environment using the current transient virtual volume comprises storing a complete copy of the memory of the virtual machine into the current transient virtual volume; and
    wherein the second trigger event that causes the current transient virtual volume to be automatically deleted comprises restoring contents of the current transient virtual volume into the memory of the virtual machine when execution of the virtual machine is resumed.

4. The method of claim 1, wherein the performance data collected for the current transient virtual volume and for at least one other, previously deleted transient virtual volume that was previously used by the virtualization environment to perform the same single function supporting execution of the same virtual machine includes at least one performance metric describing performance of both the current transient virtual volume and the other, previously deleted virtual volume that was previously used by the virtualization environment to perform the same single function supporting execution of the same virtual machine.

5. The method of claim 4, wherein the at least one performance metric describing the performance of both the current transient virtual volume and the other, previously deleted transient virtual volume that was previously used by the virtualization environment to perform the same single function supporting execution of the same virtual machine comprises total number of I/O operations performed per second.

6. The method of claim 5, wherein the at least one performance metric describing the performance of both the current transient virtual volume and the other, previously deleted transient virtual volume that was previously used by the virtualization environment to perform the same single function supporting execution of the same virtual machine further comprises total latency for all I/O operations.

7. The method of claim 6, wherein the performance data collected for the current transient virtual volume and for at least one other, previously deleted transient virtual volume that was previously used by the virtualization environment to perform the same single function supporting execution of the same virtual machine includes at least one configuration metric describing configurations of both the current transient virtual volume and the other, previously deleted transient virtual volume that was previously used by the virtualization environment to perform the same single function supporting execution of the same virtual machine.

8. The method of claim 7, wherein the at least one configuration metric describing configurations of both the current transient virtual volume and the other, previously deleted transient virtual volume that was previously used by the virtualization environment to perform the same single function supporting execution of the same virtual machine comprises total capacity.

9. A computerized system comprising:
    at least one hardware processor; and
    a memory having program code stored thereon for monitoring performance of transient virtual volumes of a virtual machine executing in a virtualization environment, wherein the program code, when executed by the processor, causes the processor to
        monitor the virtual volumes created for the virtual machine to detect when a virtual volume created for the virtual machine comprises a transient virtual volume, wherein each transient virtual volume is automatically created for the virtual machine in response to a first trigger event, wherein each transient virtual volume is used by the virtualization environment solely to perform a single function supporting execution of the virtual machine, and wherein a second trigger event causes each transient virtual volume to be automatically deleted, detect that a virtual volume created for the virtual machine is a current transient virtual volume and is being used by the virtualization environment to perform the single function supporting execution of the virtual machine, and while the virtualization environment uses the current transient virtual volume to perform the single function supporting execution of the virtual machine, collect performance data for the current transient virtual volume and combine the collected performance data for the current transient virtual volume with performance data that was previously collected for at least one other, previously deleted transient virtual volume that was previously used by the virtualization environment to perform the same single function supporting execution of the same virtual machine, wherein the combined performance data is represented as performance data for a single monitored virtual volume associated with the virtual machine.

10. The system of claim 9, wherein the current transient virtual volume comprises a swap virtual volume and the first trigger event comprises the virtual machine being started;

wherein the single function performed by the virtualization environment using the current transient virtual volume comprises storing, while the virtual machine executes, copies of virtual machine memory pages on the current transient virtual volume that cannot be retained in memory of the virtual machine, wherein the memory of the virtual machine is allocated from memory of a host computer on which the virtualization environment executes; and wherein the second trigger event that causes the current transient virtual volume to be automatically deleted comprises the virtual machine being shut down.

11. The system of claim 9, wherein the current transient virtual volume comprises a memory virtual volume and the first trigger event comprises execution of the virtual machine being suspended;

wherein the single function performed by the virtualization environment using the current transient virtual volume comprises storing a complete copy of the memory of the virtual machine into the current transient virtual volume; and wherein the second trigger event that causes the current transient virtual volume to be automatically deleted comprises restoring contents of the current transient virtual volume into the memory of the virtual machine when execution of the virtual machine is resumed.

12. The system of claim 9, wherein the performance data collected for the current transient virtual volume and for at least one other, previously deleted virtual volume that was previously used by the virtualization environment to perform the same single function supporting execution of the same virtual machine includes at least one performance metric describing performance of both the current transient virtual volume and the other, previously deleted virtual volume that was previously used by the virtualization environment to perform the same single function supporting execution of the same virtual machine.

13. The system of claim 12, wherein the at least one performance metric describing the performance of both the current transient virtual volume and the other, previously deleted virtual volume that was previously used by the virtualization environment to perform the same single function supporting execution of the same virtual machine comprises total number of I/O operations performed per second.

14. The system of claim 13, wherein the at least one performance metric describing the performance of both the current transient virtual volume and the other, previously deleted virtual volume that was previously used by the virtualization environment to perform the same single function supporting execution of the same virtual machine further comprises total latency for all I/O operations.

15. The system of claim 14, wherein the performance data collected for the current transient virtual volume and for at least one other, previously deleted virtual volume that was previously used by the virtualization environment to perform the same single function supporting execution of the same virtual machine includes at least one configuration metric describing configurations of both the current transient virtual volume and the other, previously deleted virtual volume that was previously used by the virtualization environment to perform the same single function supporting execution of the same virtual machine.

16. The system of claim 15, wherein the at least one configuration metric describing configurations of both the current transient virtual volume and the other, previously deleted virtual volume that was previously used by the virtualization environment to perform the same single function supporting execution of the same virtual machine comprises total capacity.

17. A non-transitory computer readable medium, the non-transitory medium having instructions stored thereon for monitoring performance of transient virtual volumes of a virtual machine executing in a virtualization environment, wherein the program code, when executed on a processor of a computer, causes the process to perform the steps of:

monitoring the virtual volumes created for the virtual machine to detect when a virtual volume created for the virtual machine comprises a transient virtual volume, wherein each transient virtual volume is automatically created for the virtual machine in response to a first trigger event, wherein each transient virtual volume is used by the virtualization environment solely to perform a single function supporting execution of the virtual machine, and wherein a second trigger event causes each transient virtual volume to be automatically deleted;

detecting that a virtual volume created for the virtual machine is a current transient virtual volume and is being used by the virtualization environment to perform the single function supporting execution of the virtual machine; and while the virtualization environment uses the current transient virtual volume to perform the single function supporting execution of the virtual machine, collecting performance data for the current transient virtual volume and combining the collected performance data for the transient virtual volume with performance data that was previously collected for at least one other, previously deleted transient virtual volume that was previously used by the virtualization environment to perform the same single function supporting execution of the same virtual machine, wherein the combined performance data is represented as performance data for a single monitored virtual volume associated with the virtual machine.

* * * * *